United States Patent
Hofeldt et al.

(10) Patent No.: US 9,977,154 B2
(45) Date of Patent: May 22, 2018

(54) PRECISION CONTROL OF WEB MATERIAL HAVING MICRO-REPLICATED LENS ARRAY

(75) Inventors: David L. Hofeldt, Oakdale, MN (US); Robert L. Brott, Woodbury, MN (US); Daniel H. Carlson, Arden Hills, MN (US); James N. Dobbs, Woodbury, MN (US); Andrzej P. Jaworski, Woodbury, MN (US); Glen A. Jerry, Roseville, MN (US); John T. Strand, Stillwater, MN (US); Michael J. Sykora, New Richmond, WI (US); Karl K. Stensvad, Inver Grove Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 741 days.

(21) Appl. No.: 13/583,887

(22) PCT Filed: Mar. 30, 2011

(86) PCT No.: PCT/US2011/030419
§ 371 (c)(1),
(2), (4) Date: Sep. 26, 2012

(87) PCT Pub. No.: WO2011/123485
PCT Pub. Date: Oct. 6, 2011

(65) Prior Publication Data
US 2013/0009329 A1    Jan. 10, 2013

Related U.S. Application Data

(60) Provisional application No. 61/320,197, filed on Apr. 1, 2010.

(51) Int. Cl.
*B29C 59/00*    (2006.01)
*G02B 3/00*    (2006.01)
(Continued)

(52) U.S. Cl.
CPC ............ *G02B 3/0075* (2013.01); *B29C 43/58* (2013.01); *B29C 59/026* (2013.01);
(Continued)

(58) Field of Classification Search
CPC .. G02B 3/0012; G02B 3/0031; B29C 59/026; B29C 59/046; B29C 2059/023; B29C 43/58; B29C 2043/585; B29D 11/00663
(Continued)

(56) References Cited

U.S. PATENT DOCUMENTS 4,532,430 A * 7/1985 Ross .................. G01N 21/8901
                                                         250/227.31
5,068,799 A    11/1991 Jarrett
(Continued)

FOREIGN PATENT DOCUMENTS

EP    0897129    2/1999
EP    1055966    11/2000
(Continued)

OTHER PUBLICATIONS

PR-650 Overview. http://www.horiba.com/uk/scientific/products/light-measurement/spectroradiometers/details/pr-650-8750. Horiba Scientific, Photo Research. pp. 1-2. Published Feb. 13, 2011. Accessed online Apr. 29, 2017.*
(Continued)

*Primary Examiner* — Atul P. Khare
(74) *Attorney, Agent, or Firm* — Scott A. Baum; Adrian L. Pishko; James A. Baker

(57) ABSTRACT

A manufacturing system includes a sensing system that provides high-resolution feedback for web guiding and tension control. The system may be especially useful for web material that is manufactured to include micro-replicated structures with micron size scale. A micro-replication station forms a pattern of micro-replicated lenses on a web
(Continued)

material. The sensing system illuminates a measurement area on the web material and detects an angular distribution of light exiting a set of the micro-replicated lenses within the first measurement area. A control system that adjusts at least one process control parameter of the transport system based on the detected angular distribution.

29 Claims, 11 Drawing Sheets

(51) Int. Cl.
 *B29C 59/02* (2006.01)
 *B29C 59/04* (2006.01)
 *B29D 11/00* (2006.01)
 *B29C 43/58* (2006.01)

(52) U.S. Cl.
 CPC ...... *B29C 59/046* (2013.01); *B29D 11/00663* (2013.01); *G02B 3/0031* (2013.01); *B29C 2043/585* (2013.01); *B29C 2059/023* (2013.01)

(58) Field of Classification Search
 USPC ................. 264/1.32, 1.34, 1.6, 40.1, 40.7
 See application file for complete search history.

(56) References Cited

U.S. PATENT DOCUMENTS

| | | | |
|---|---|---|---|
| 6,717,675 B1 | 4/2004 | Munch | |
| 6,829,050 B2 | 12/2004 | Ikeda | |
| 6,833,960 B1 | 12/2004 | Scarbrough | |
| 6,985,789 B2 | 1/2006 | Carlson | |
| 7,100,510 B2 | 9/2006 | Brost | |
| 7,110,103 B2 | 9/2006 | Montgomery | |
| 7,170,045 B2 | 1/2007 | van Gastel | |
| 7,224,529 B2 | 5/2007 | King | |
| 7,295,315 B2 | 11/2007 | Johnson | |
| 7,296,717 B2 | 11/2007 | Swanson | |
| 7,336,422 B2 | 2/2008 | Dunn | |
| 7,359,120 B1 | 4/2008 | Raymond | |
| 7,365,848 B2 | 4/2008 | Raval | |
| 7,417,798 B2 | 8/2008 | King | |
| 7,444,932 B2 | 11/2008 | Strand | |
| 7,477,403 B2 | 1/2009 | Gui | |
| 7,530,721 B2 * | 5/2009 | Mi ................... | B29D 11/00663 362/606 |
| 7,542,821 B2 | 6/2009 | Floeder | |
| 7,573,574 B2 | 8/2009 | Hinnen | |
| 7,586,685 B2 | 9/2009 | Dunn | |
| 7,593,132 B2 | 9/2009 | Bast | |
| 7,650,839 B2 | 1/2010 | Brost | |
| 7,804,649 B2 * | 9/2010 | Eckhardt .............. | G02B 3/0031 359/619 |
| 8,405,831 B2 * | 3/2013 | Carlson .............. | B65H 23/0204 356/239.1 |
| 8,755,101 B2 * | 6/2014 | Lundvall .............. | B29C 59/046 359/9 |
| 8,917,447 B2 * | 12/2014 | Wolk .................. | G02B 27/2214 359/452 |
| 2005/0151977 A1 | 7/2005 | Blalock | |
| 2005/0207031 A1 * | 9/2005 | Eckhardt .............. | G02B 3/0031 359/741 |
| 2005/0231809 A1 * | 10/2005 | Carlson ................. | B29C 59/046 359/619 |
| 2006/0209428 A1 | 9/2006 | Dobbs | |
| 2007/0081715 A1 | 4/2007 | Chaput | |
| 2008/0304055 A1 * | 12/2008 | Oshima .............. | G01N 21/9501 356/237.5 |
| 2009/0030544 A1 * | 1/2009 | Floeder .............. | G01N 21/8851 700/122 |
| 2011/0058239 A1 * | 3/2011 | Lundvall .............. | B29C 59/046 359/9 |

FOREIGN PATENT DOCUMENTS

| | | |
|---|---|---|
| WO | WO 2006-098934 | 9/2006 |
| WO | WO 2008-157623 | 12/2008 |
| WO | WO 2009-085004 | 7/2009 |

OTHER PUBLICATIONS

PR-6-Series Brochure. PR-655, PR-670, PR-680, and PR-680L SpectraScan® Spectroradiometers. http://www.photoresearch.com/sites/default/files/PR-6%20Series%20%20Brochure_2.pdf. Photo Research. pp. 1-8. Published Sep. 3, 2009. Accessed online Apr. 29, 2017.*

EZContrast-MS. https://www.eldim.eu/optical-metrology. Eldim. pp. 1-4. Published May 2015.*

Viewing Cone Measurement. http://www.bosontech.com.cn/catalog/EZContrast.pdf. Eldim. Published May 2009, Accessed Apr. 29, 2017.*

Viewing Angle Measurements. https://www.eldim.eu/optical-metrology. Eldim. 1 Page. Updated Jan. 11, 2017. Accessed online Apr. 29, 2017.*

Hutley et al., "Optical inspection of arrays and periodic structures using moiré magnification," IEE Digest, vol. 1999, Issue 187, 6 pages.

International Search Report for PCT/US2011/030419, dated Nov. 11, 2011, 6 pages.

* cited by examiner

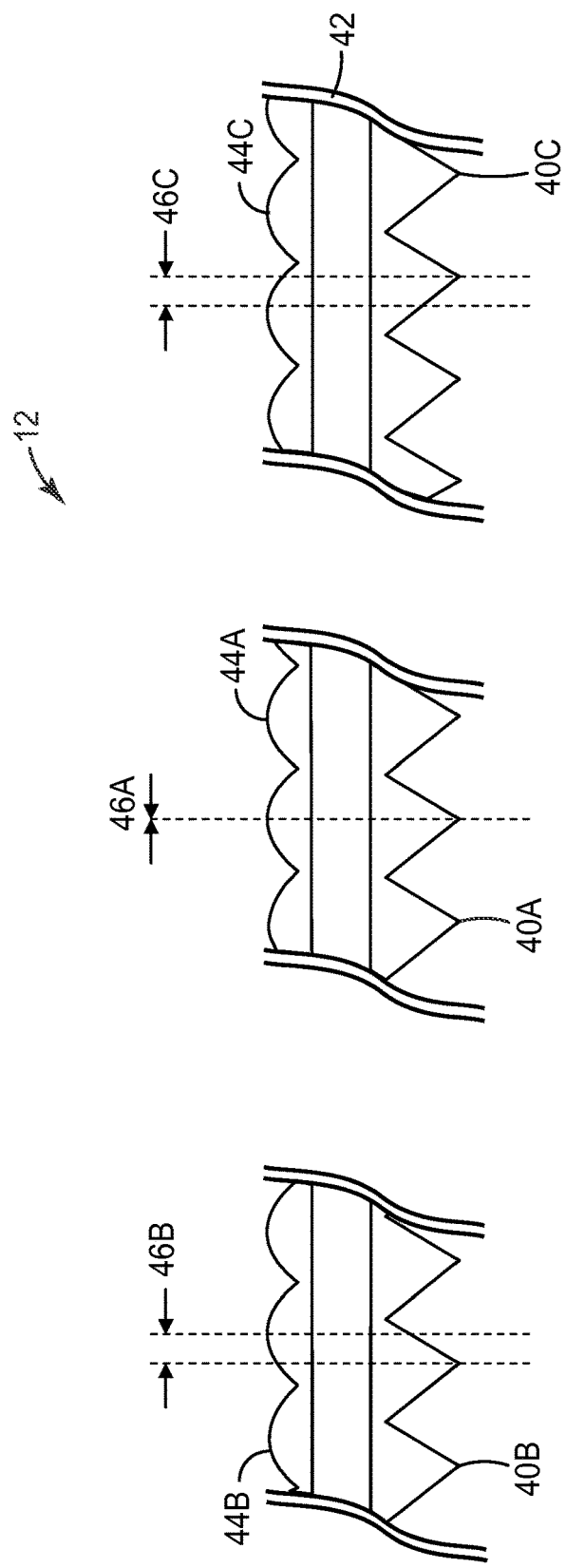

PRECISION CONTROL OF WEB MATERIAL HAVING MICRO-REPLICATED LENS ARRAY

CROSS REFERENCE TO RELATED APPLICATIONS

This application is a national stage filing under 35 U.S.C. 371 of PCT/US2011/030419, filed Mar. 30, 2011, which claims the benefit of U.S. Application No. 61/320,197, filed Apr. 1, 2010, the disclosure of which is incorporated by reference in its/their entirety herein.

TECHNICAL FIELD

The invention relates to web manufacturing techniques.

BACKGROUND

A manufactured web material that may be any sheet-like material having a fixed dimension in one direction and either a predetermined or indeterminate length in the orthogonal direction. Examples of web materials include, but are not limited to, metals, paper, wovens, non-wovens, glass, polymeric films, flexible circuits or combinations thereof. Metals may include such materials as steel or aluminum. Wovens generally include various fabrics. Non-wovens include materials, such as paper, filter media, or insulating material. Films include, for example, clear and opaque polymeric films including laminates and coated films.

Web manufacturing processes typically utilize continuous feed manufacturing systems, such as manufacturing systems used to produce paper, film, tape, and the like, and often include one or more motor-driven rotatable mechanical components, such as rollers, casting wheels, pulleys, gears, pull rollers, extruders, gear pumps, and the like. These systems often include electronic controllers that output control signals to engage the motors and drive the web at pre-determined speeds.

When manufacturing web based products that require down-web or cross-web alignment of features on each side of the web, it is important to carefully manage the cross-web and down-web positions, as well as the web strain, to control proper feature alignment. Existing web control strategies to manage these parameters may be limited by the quality of a measurement that provides position feedback to the web control system to maintain the relative alignment of web features.

SUMMARY

In general, this document describes techniques that provide high resolution measurement and feedback for the alignment of web features. The techniques may be especially useful for web material that is manufactured to include micro-replicated structures with micron size scale. The techniques provide accurate, on-line measurements on the relative positions of micron and sub-micron features. The data can be fed to lateral and longitudinal control systems to provide real-time, sub-micron corrections for controlling alignment of micro-structured features of a web.

In one example, the techniques are applied to web materials manufactured to contain arrays of micro lenses, i.e., lenses having diameters on the order of tens to hundreds of microns. The micro lenses may be an integral part of the product delivered to customers, such as in the case of light angle control films, integral imaging films, light extraction arrays, biomedical sensors, CCD and CMOS array sensors, and solar cell arrays. In other examples, the micro lenses may be introduced and manufactured on portions of the web not utilized for customer product (e.g., at the edges) so as to provide mechanisms for sub-micron process control.

As described herein, the techniques may utilize an array sensor (e.g., a CCD camera) to record an angular distribution of light emitted from the micro lenses when illuminated by one or more light sources. A measurement system or control system may monitor the angular distribution of the light leaving the micro lenses and accurately determine the relative position (i.e., registration) between the lenses and features that affect light distribution that lie in the focal plane of the lenses. For submicron alignment, this can be accomplished using an array of micro lenses with characteristic pitches and radii on the order of tens of microns. In one sense, the techniques allow the relative registration between features of a web material to be transformed into an angular distribution, which can be compared to an expected angular distribution.

The techniques described herein may offer advantages relative to manufacturing systems that utilize image-based positioning systems to determine web position based on imaged fiducial marks on the web. The position resolution of such systems is physically limited by the diffraction limit of an objective lens system of the system and the wavelength of the incident light. Additionally, such high-resolution objectives have very small depths of field, so that it is difficult for a single sensor to maintain focus across both sides of the web. Moreover, such systems often require a form of high-speed auto-focus to maintain focus in the presence of natural depth fluctuations that occur for a moving web.

In one embodiment, a manufacturing system includes a micro-replication station that forms a pattern of micro-replicated lenses on a web material, a transport system that conveys the web material through the micro-replication station, a sensing system that illuminates a measurement area on the web material and detects an angular distribution of light exiting a set of the micro-lenses within the first measurement area, and a control system that adjusts at least one process control parameter of the transport system based on the detected angular distribution.

In another embodiment, a method includes conveying web material with a transport system through a micro-replication station of a manufacturing process, and forming a pattern of micro-replicated lenses on the web material with the micro-replication station. The method further comprises after forming the pattern of micro-replicated lenses, detecting an angular distribution of light from the micro-lenses of the web material; and adjusting at least one process control parameter of the transport system based on the detected angular distribution.

In a further embodiment, a method includes conveying web material with a transport system between a first pattern forming tool and a second pattern forming tool of a manufacturing process, forming a first pattern on the web material with the first pattern forming tool, and forming a second pattern on the web material with the second pattern forming tool. The method also includes, after forming the first and second patterns, detecting a relative distance between features of the first pattern and features of the second pattern, and adjusting at least one process control parameter of the web transport system based on the detected relative distance.

In yet another embodiment, a method includes conveying web material with a transport system through a replication station of a manufacturing process, and forming a pattern of replicated lenses on the web material with the replication station. The method also includes, after forming the pattern of replicated lenses, detecting an angular distribution of light from the replicated lenses of the web material, and adjusting at least one process control parameter of the web transport system based on the detected angular distribution.

In a further embodiment, a method includes conveying web material with a transport system through a micro-replication station of a manufacturing process, and forming micro-replicated optical features on a first surface the web material with the micro-replication station. The method also includes, after forming the micro-replicated optical features, detecting an angular distribution of light from the micro-replicated optical features of the web material, and adjusting at least one process control parameter of the web transport system based on the detected angular distribution.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2 depicts three possible cross-sections of an example light angle control film product from web material, wherein the alignment between the micro lenses and the opposing-side structures differs between the various representations.

DETAILED DESCRIPTION

Figure 1:
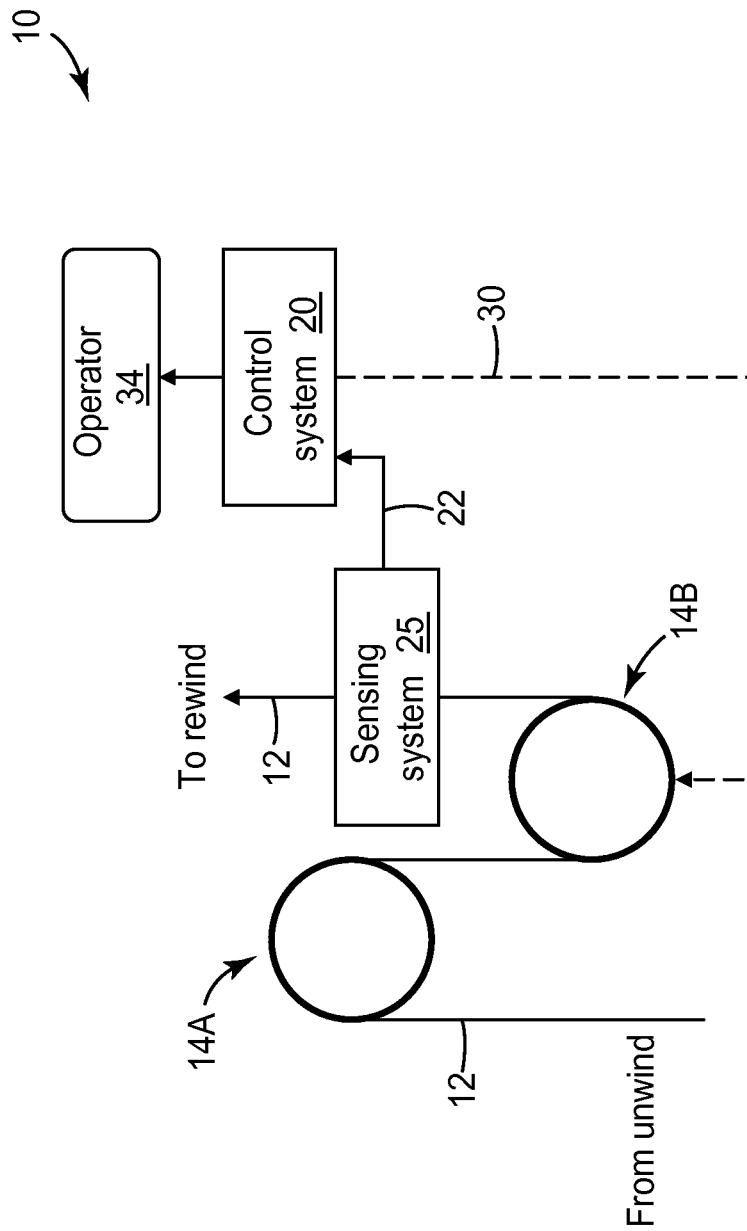
FIG. 1 is a block diagram illustrating a portion of a web-based manufacturing system 10 operating in accordance with principles of the invention.

FIG. 1 is a block diagram illustrating a portion of a web-based manufacturing system 10 operating in accordance with principles of the invention. In this particular example, a segment of a web transport system is shown that contains a number of driven rollers and idler rollers so as to move web material 12 through the web transport system.

In this example, web-based manufacturing system 10 includes two micro-replication tools 14A, 14B (collectively, "tools 14"), one following the other. The micro-replication tools produce web material 12 that have microstructures that may, for example, run continuously in the down-web direction, or that may form some other two-dimensional (2D) pattern that simply repeats with rotations of the tools. Such a configuration may be useful, for example, in manufacturing web material 12 to include micro-replicated structures with micron size scale.

In one example, web material 12 is formed as a two-sided film having opposed patterns of microstructures on both a bottom and a top side of the material. In this example, each of the patterns of micro-structures is formed to have a corresponding pitch or periodicity in the cross-web direction. In other words, the micro-replicated patterns are constructed to repeat in the cross-web direction in accordance with a defined spacing. Moreover, the opposed patterns of micro-structures on different sides of web material 12 may be formed at a different pitch or periodicity in the cross-web direction. Further, the opposed micro-replicated patterns are placed on web material 12 so that individual features from the opposed patterns have a known desired alignment relative to the axes of the micro lenses at one or more cross-web positions. In a further aspect, micro-replicated patterns may not be uniformly spaced as a function of web position. In another aspect, such as in the case of 2D micro structure arrays, the opposed patterns of micro-structures are placed on web material 12 so that individual features from the opposed patterns align in both the down-web and cross-web directions.

In one example embodiment, web material 12 is manufactured to have a micro-replicated pattern of symmetric prisms on one surface and a micro-replicated pattern of cylindrical lenses on the other surface. In general, web material 12 may be any flexible or inflexible substrate having micro-replicated patterns that cooperate to form a plurality of optical features. Since the performance of each feature is a function of the alignment of the opposed features forming each lens, precision alignment or registration of the lens features may be preferable. The micro-replicated patterns may be an integral part of the product delivered to customers, such as in the case of light angle control display films, integral imaging films, light extraction arrays, and solar cell arrays. In other examples, tools 14 form the one or more of the micro-replicated patterns on portions of web material 12 not utilized for customer product (e.g., at the edges of the web) so as to provide mechanisms for sub-micron process control by control system 20 and sensing system 25. Further details of example techniques for forming two-sided articles having micro-replicated structures are described in U.S. Pat. No. 7,224,529 and U.S. Pat. No. 7,417,798, the entire content of each being incorporated herein by reference.

In accordance with the techniques described herein, sensing system 25 provides accurate, on-line measurements of the relative positions of the features formed by tools 14A, 14B. As described herein, sensing system 25 may include an array sensor (e.g., a CCD camera) that records an angular distribution of light rays produced by the micro lenses of web material 12 when illuminated by one or more light sources. In one aspect, control system 20 monitors the angular distribution of the light leaving the micro lenses for each of the light sources to accurately determine the relative position between the lenses and other micro-features on web material 12 that lie in the focal plane of the lenses and affect light distribution. In another aspect, control system 20 monitors the angular distribution of the light leaving the micro lenses to determine the relative position between the lenses and tool 14B, during the formation of the set of micro structures by tool 14B. In this example, the determination generally requires a reflective rather than transmissive sensing geometry, but the concepts are similar. This aspect is discussed further with respect to FIG. 9B. Submicron alignment can be accomplished using an array of micro lenses with characteristic pitches and radii on the order of tens of microns.

Angular signals sensed by the sensor may be converted into position signals 22 by a measurement system (not shown in FIG. 1) of sensing system 25. Position signals 22 from sensing system 25 are fed to control system 20 system to provide real-time, sub-micron corrections for steering and tension control of the transport of web material 12 through one or both of tools 14. That is, control system 20 of the web-based manufacturing system receives signals 22 from sensing system 24, which indicate with sub-micron accuracy the relative positions of micro-features formed by tool 14A relative to micro-features formed by tool 14B. Control system 20 processes the relative position signals 22 and determines in real-time certain process control parameters of web material 12 in real-time as the web material continuously flows through tools 14 and web manufacturing system 10. In some examples, sensing system 25 senses position signals 22 relative to more than one position of web material 12 at a given time, and from these data, the control system computes position signals that can be used to monitor web strain and tension. For example, control system 10 may process signals 22 to provide closed-loop control of web tension within web material 12 or to accurately maintain real-time sub-micron alignment of the different micro-replicated features of web material 12. In various aspects, sensed angular distribution data may be converted into position signals at the sensor, by a measurement system of sensing system 25, by a host computer, or at a remotely located computing device.

As shown in FIG. 1, sensing system 25 may be positioned downstream from the tools 14, but may be used for position control as web material 12 is transported through various stages from first tool 14A to second tool 14B where the second layer of micro features, i.e., micro lenses in this example, are formed. Position and tension control upstream from sensing systems 25 may be achieved because the relative registration and alignment of the multiple layers of micro features of web material 12 is fixed when the second set is formed by second tool 14B and, therefore, are unaffected by any tension or position variations that may occur downstream from tool 14B but upstream from sensing systems 25. Tools 14A, 14B generally represent process components having focusing elements for forming features on the web or otherwise controlling the transport of the web. Other examples of process components include a steering roll having the focusing elements to sense transmitted or reflected light to steer the web, or a printing station to print a set of features with the focusing elements.

In another aspect, sensing system 25 may be positioned at tool 14B to measure the relative registration and alignment of a layer of micro lenses and features of tool 14B for forming micro structures. This may allow for more immediate adjustment of process control parameters in real time.

In some embodiments, tools 14 may be located at a single station, while in other embodiments, tools 14 may be located at separate stations. While described generally in terms of tools 14, micro replicated features may be formed on web material by a variety of processes, such as curing, embossing, extruding, laminating, molding, or other process.

For example, based on the relative position signals 22 provided by sensing system 25, control system 20 outputs various actuator control signals 30 to modify one or more transport elements of web manufacturing system 10. For example, control system 20 may output actuator control signals 30 to control a drive motor (not shown) of one or more the rollers of the transport system. As other examples, control system 20 may provide actuator control signals to one or more lateral stages that can be positioned to sub-micron accuracy, where the actuators may be piezoelectric, linear motors, voice coils, or other devices for adjusting the position of the web material 12 relative to the tools 14. Further details of example techniques that may be used for aligning two-sided articles having micro-replicated structures are described in U.S. Pat. No. 7,296,717, entitled Method and apparatus for controlling a moving web, the entire content being incorporated herein by reference.

Control system 20 may, for example, control the position, velocity, and/or torque of one or more of the drive rollers to control the web tension or strain. Similarly, control system 20 may output actuator control signals 30 to vary a span length between the rollers to alter the web strain or tension. Example techniques for controlling web tension are described in U.S. Pat. No. 6,985,789, the entire content of which is incorporated herein by reference. As another example, control system 20 may adjust a temperature of one or more of tools 14.

As another example, computed process control parameters, such as a current web tension value or a current alignment of tools 14, determined by control system 20 may be displayed to an operator 34 in order to allow the operator to modify an operating parameter of the web-based manufacturing system 10. In this way, control system 20 may monitor the relative position of the different micro-features as represented by signals 22 and, based on the signals, compute process control parameters for use as feedback data in real-time control of the web transport system. Other well-known system parameters associated with web-based manufacturing system 10 may be controlled in response to the sub-micron accuracy provided by relative position data derived from angular signals. As such, the above system may be viewed in some embodiments as a system that generates a value for an observed web parameter, such as tension or modulus, in web material 12 for use in any other application within such a system.

In one example embodiment, control system 20 is a general-purpose programmable computer executing software for use as a web transport controller. Control system 20 typically includes one or more programmable processors for executing software instructions, memory (e.g., RAM), one or more mass storage devices (e.g., hard drives, flash memory) and various interface modules for communications with external devices. An operating system executing within control system 20 may provide a means for execution of software instructions in the form of program code.

FIG. 2 depicts a cross-section of an example angle turning film product from web material 12. In this example, web material 12 includes a microprism array that includes microprisms ("microprisms 40") coated on a bottom surface of substrate 42 by tool 14A. In addition, web material 12 includes a microlens array that includes microlenses ("microlenses 44") coated on a top surface of substrate 42 by tool 14B. The three parts of the figure indicate that the positions of the microprisms 40A-40C may shift relative to the positions of the micro lenses 44A-44C at a representative position on the web. This shift may be the result of variations in alignment associated with process variations that occur, or the offset in alignment may actually be part of the desired product structure. Tools 14 form these micro structure array elements to continuously repeat on both the bottom and top surfaces. These features may run continuously in the down-web direction so that the lenses have refractive power only about the cross-web direction, or they may be lenses that are refractively active in two-dimensions, i.e. both down-web and cross-web. The latter are often referred to as two-dimensional lens arrays.

In the example shown, each microlens 40 of the microlens array is formed with a lens radius of curvature in a range of one to 1500 microns, preferably in the range of tens to hundreds of microns, and each microprism 44 of the microprism array is formed such that a height of the microprism tips are nominally at a focal point of the microlenses. In general, the resolution of alignment measurement will scale with the size of the optical features. To provide certain visual affects when applied as an angle turning film, microlenses 44 and microprisms 40 are formed with sub-micron registration in the cross-web direction. Moreover, the cross-web pitch or periodicity of the micro features (i.e., the microlens and microprism arrays) must be carefully controlled, sometimes with nanometer level precision, and need not always be the same for the opposing features, nor the same at different positions on the web.

Maintaining precise registration between the features on each side of the web substrate within sub-micron tolerance allows for increased yield of acceptable product. Since web material 10 can steer (i.e., slightly shift in the cross-web direction) in the transport region between the two micro-replication stations 14, and given there may be multiple distinct tension zones leading up to each of the stations, it is desirable to have micron or even sub-micron control of alignment and pitch of micro lenses 44 and micro-prisms 40 across the length and width of web material 12.

Figure 3B:
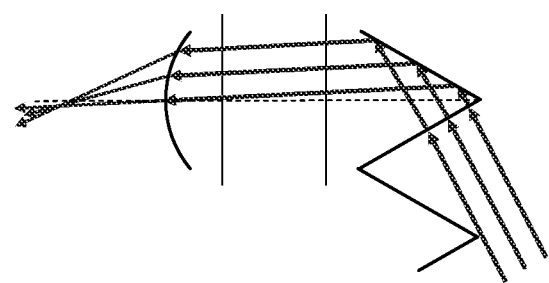
FIGS. 3A and 3B illustrate how the angular distribution of the light coming from any given microlens depends on the alignment between the tip of the associated prism and the axis of the lens.
Figure 3A:
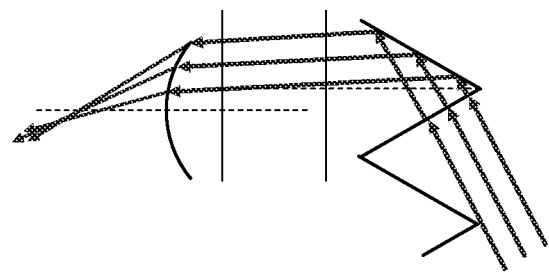

FIGS. 3A-3B illustrate representative rays projected in a light angle control film. The angular distribution of light leaving any given lens is a function of the alignment between the tips of the micro-prisms 40 and optical axes of the micro lenses 44 given a fixed incidence angle, fixed prism apex angle, and fixed lens radius of curvature. Since the angular distribution from the film is a function of the alignment, to control the pitch, one can measure how the angular distribution varies with position across the web, and relate that to changes in alignment that occur with position.

In order to create certain visual affects for images presented through the film to a viewer within a defined viewing angle, the desired alignment of the features can be a function of position across the film. So for example, the micro features shown in FIG. 3A are aligned, and let us assume that this is the desired relative alignment at some position on the film. On the other hand, FIG. 3B illustrates a shift between the opposing micro features, and this shift would result in a different angular distribution than that measured for the case of FIG. 3A. If this shift occurred at a position where the alignment shown in FIG. 3B was expected, it is likely that the product will have unacceptable performance; however, if this alignment occurs at a different location on the film, it might well be the desired alignment. So in the case where the alignment can vary as a function of position on the film, to determine whether the features are properly aligned, one must know the position on the film at which the angular distribution is measured. Thus, in this example one needs to know where the sensor is located on the film in order to properly interpret the angular data output. Techniques for determining the location of the sensor relative to the film are described below.

Figure 4A:
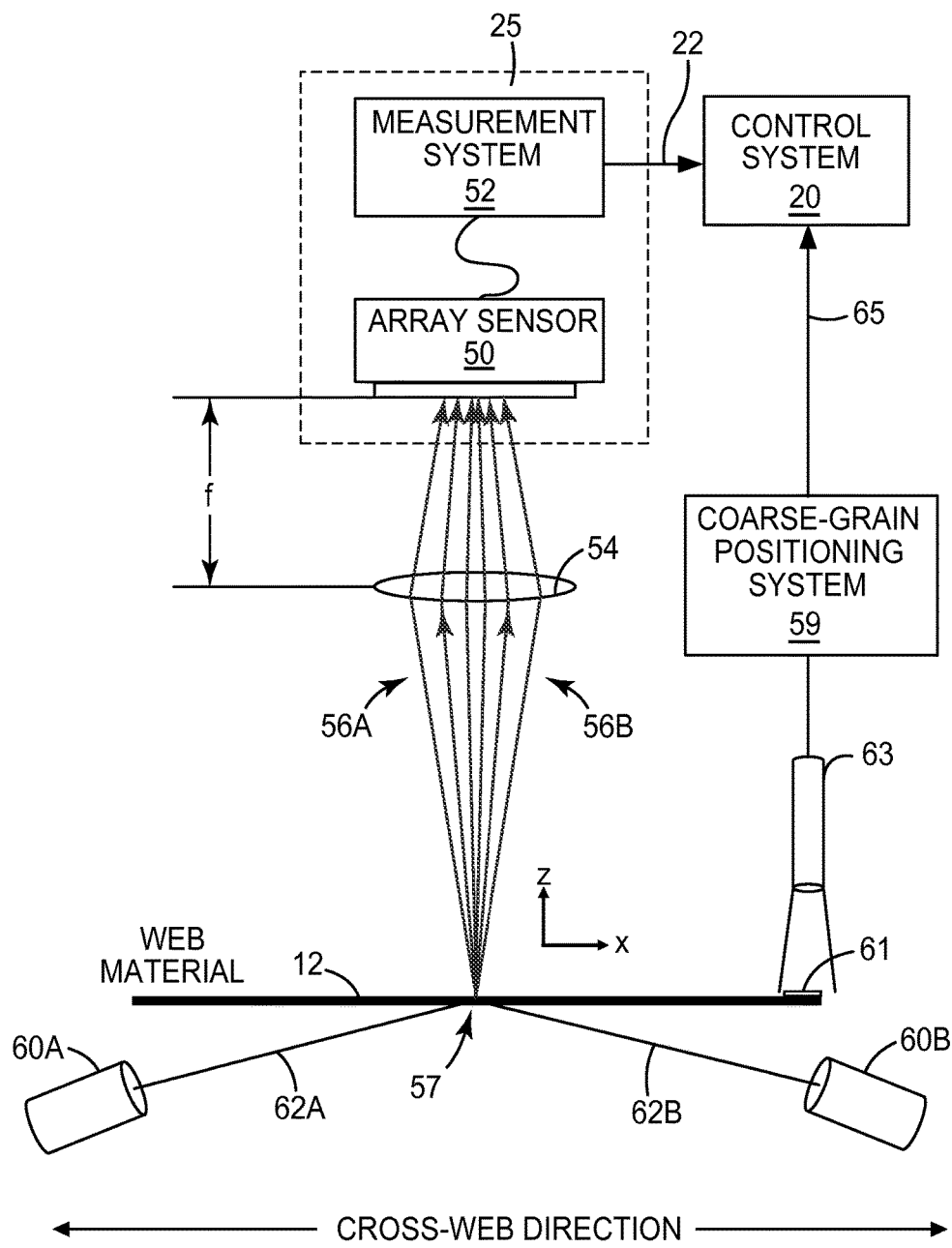
FIG. 4A is a block diagram illustrating an example embodiment of a sensing system that measures the angular distribution coming from the micro lenses at known positions on the web material during manufacturing.

FIG. 4A is a block diagram illustrating an example embodiment of sensing system 25 that measures the angular distribution coming from the micro lenses at known positions on web material 12 during manufacturing. Sensing system 25 provides position signals 22 to control system 20 for controlling alignment of the micro-structured features. Coarse positioning system 59 provides a position reference frame that is fixed in the stationary coordinate system of the manufacturing line, and wherein sensor 63 tracks movements of the fiducial feature 61 on the web that may occur during the manufacturing process in that fixed coordinate frame. The position of sensing system 25 is also known in the fixed coordinate system, and so the position of sensor 25 is known relative to the fiducial position on the web at all times. The resolution of coarse positioning system 59 in general should be at least sufficient to resolve any periodicity in the relative alignments of the opposing structures. More often, the required spatial resolution is dictated by the rate of change of the expected angular distribution of the microstructured product, which for example may be in the range of 0.1-1 deg/mm, the allowable tolerance range for which a certain angular output is supposed to be created by the film, which may be in the range of 0.1-10 mm, and the angular resolution of sensing system 25, which may be on the order of 0.01-0.1 deg. For typical combinations of these numbers, 0.1 mm resolution from coarse positioning system 59 is generally adequate, although systems with several micron resolution are readily available if needed.

In one embodiment, measurement system 52 makes use of the optical property of lenses in which the light intensity distribution in the back focal plane of a lens is the Fourier transform of the angular distribution of wavefronts entering the lens. In one example, an array sensor 50 (e.g. a CCD camera) is located at the focal plane of multi-element lens 54 to record the angular distribution of light rays 56A, 56B entering the lens. In another example, a single element sensor may scan across the range of angles as a function of time to record the angular distribution of light rays 56A, 56B entering the lens.

In one example, lens 54 is a multi-element lens designed to record a moderate range of angles (e.g. ±30° simultaneously across array sensor 50 from a measurement area 57 having a measurement spot size on the order of 1 mm. In the example product of FIG. 2, if the pitch of the micro lenses is in the range of 30-100 microns, then a 1 mm spot size would result in illumination of approximately 10-33 micro lens/micro prism pairs. In this case, the resultant angular distribution is insensitive to abnormalities that may exist in any one individual feature and may more accurately represent the alignment of the overall micro features. Obviously, the choice of the spot size cannot be so large as to wash out all variation in angular output with position, but neither does the spot size need to be so small as to completely eliminate all variation with angle. The resultant angular output integrates across the angular distribution from the microstructures that are illuminated. The spot size can be adjusted as needed either by focusing the input beam or reducing the field-of-view of the multi-element lens system 54.

Figure 4B:
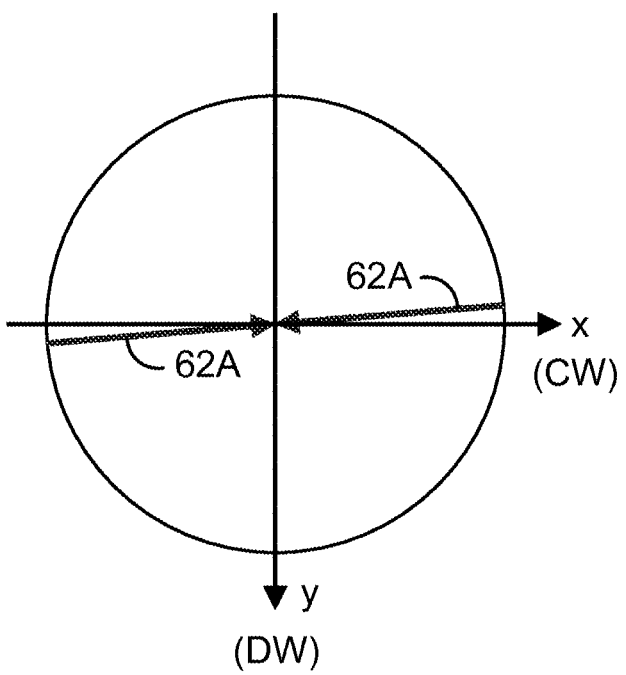
FIG. 4B, for example, is a bottom view showing that incidence directions of source beams are rotated slightly relative to the cross-web direction.

In the example of FIG. 4A, two different light sources 60A, 60B are positioned substantially opposite from each other in the cross-web direction so as to simultaneously illuminate measurement area 57 of web material 12 with light beams 62A and 62B, respectively. In one example, 2D array sensor 50 records angular distributions of light beams 56A and 56B about both the X axis (cross-web) and Y axis (down-web) simultaneously. In one embodiment, light sources 60A and 60B are slightly rotated about the region of interest (e.g., by a few degrees) to arrange the incident beam angles so that the distributions from the light sources can be recorded simultaneously without cross-talk. In this example, this takes advantage of the fact that cylindrical micro lenses 44 on web material 12 refract light only about the Y axis. FIG. 4B, for example, is a bottom view showing that incidence directions of source beams 62A, 62B are rotated slightly relative to the cross-web direction so that resultant angular distributions recorded by array sensor 50 for the light sources 60 are separated on the sensing region of array sensor 50. This allows for separation of captured light beams in both the X and Y directions. In another embodiment, only a single one of light beams 62A, 62B may be used for detecting an angular distribution of the light emitted by the micro-replicated lenses. A single light beam is sufficient for detecting the angular distribution, but adding a second light source may improve the accuracy and resolution of the system.

In another embodiment, a wavefront sensing system may be used to analyze angular distributions simultaneously from a number of points on the film, provided the range of angular outputs from the film fell within the range of angles measurable by the wavefront sensor.

Figure 5:
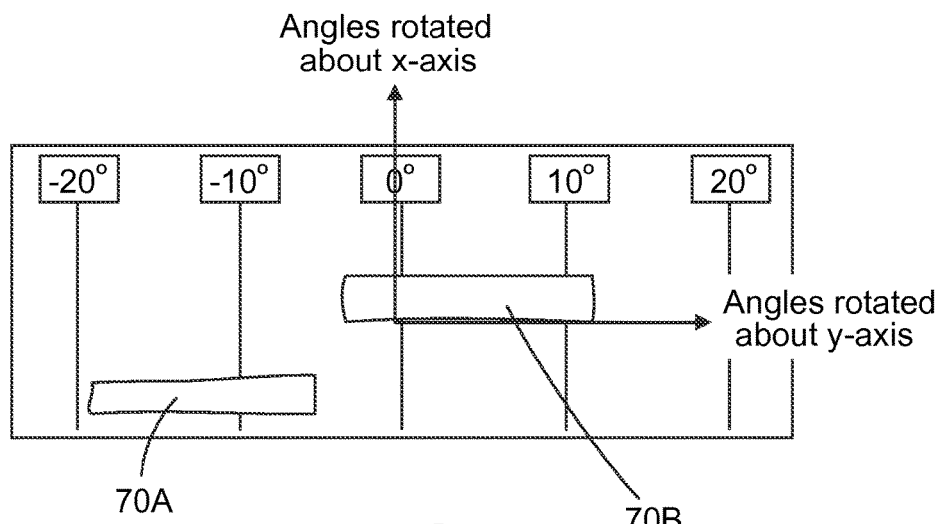
FIG. 5 is a graph showing example angle distribution data captured by an array sensor.

FIG. 5 is a graph showing example angle distribution data captured by array sensor 50. In this example, micro-prisms 40 and micro lenses 44 illuminated by light beam 62A from light source 60A produced light beam 56A to have an angular distribution 70A between approximately −6° to −18° from the X axis. Similarly, the same micro-prisms 40 and micro lenses 44 illuminated by light beam 62B from light source 60B produced light beam 56B to have an angular distribution 70B between approximately −4° to +12° from the X axis. While the angle distribution data of FIG. 5 is shown for ease of illustration as having a uniform intensity, other angle distribution data may have a non-uniform intensity distribution.

In the light angle control film application, measurement system 52 analyzes the angular distribution recorded by array sensor 50 using image processing algorithms. Based on the analysis, measurement system 52 produces position signals 22 indicative of the alignment between the prism tips and the axes of the micro lenses in the 1-2 mm diameter measurement area 57 defined by the collection optics and the input beams.

Figure 6A:
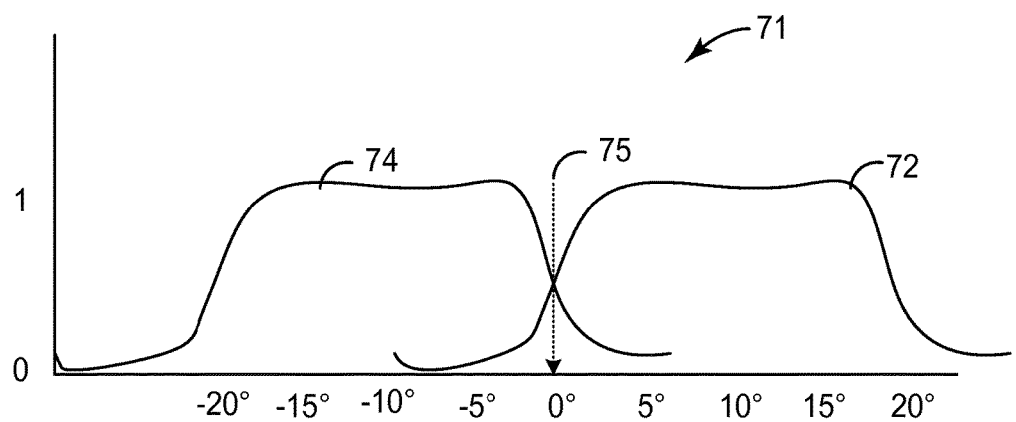
FIGS. 6A, 6B are graphs illustrating analyses of the angular distribution of the light beams.

FIG. 6A is a graph 71 illustrating one way in which measurement system 52 analyzes the angular distribution of light beams 56A, 56B. In this example, measurement system 52 constructs a one-dimensional projection (i.e., one dimension of sensed data) from the two-dimensional data for angular distribution 70A shown in FIG. 5. Similarly, measurement system 52 constructs a one-dimensional projection from the two-dimensional data for angular distribution 70B. Measurement system 52 then normalizes the data values of the projections based on various factors, such as any optical or power differences between the lights sources used by the different sensing systems 25. FIG. 6A shows a graph of two example normalized projections 72, 74 having data values ranging from 0 to 1. Measurement system 52 then analyzes the normalized data to identify a crossing point 75 for the two one-dimensional projections 72, 74, where the crossing-point represents the angle that bisects the two distributions from the different sources. This bisector angle has an expected behavior versus cross-web position X because the alignment of the prisms with the lenses is a function of X. In one embodiment, measurement system 25 conveys the angular position of this identified crossing 75 point to control system 20 in the form of position signals 22.

The example of FIG. 6A shows an instance where crossing point 75 for the angular projections is located at zero degrees. If measurement area 57 is expected to coincide with a particular location of the product where the crossing point is expected to be located at zero degrees, (e.g., microlens 44A and microprism 40A of FIG. 2), then the example of FIG. 6A illustrates a product in proper registration.

However, in some products the microfeatures may be specifically formed such that spacing of the microfeatures varies relative to position on the product, such as by having a differential pitch rate (periodicity) in the crossweb direction so that the alignment between the micro-features shifts across a width of the product. In such examples, the expected angular distribution is a function of the cross-web position of measurement area 57 on the film. In such examples, as explained above, web manufacturing system 10 may utilize a coarse-grain positioning system 59 (FIG. 4) to keep track of the cross-web position of measurement area 57 relative to the position of the product. In one example, a coarse-grain web tracking sensor is used to monitor movement of fiducial marks 61 on web material 12 as the web material may wander back and forth in the coordinate system as a result of normal web steering movements. Control system 20 uses this information to determine a current cross-web position of measurement area 57. Based on this determined position, control system 20 can determine an expected angular distribution for each of light beams 56A, 56B and, in one example, and expected crossing point for the normalized, one-dimensional projections. An actual angular distribution can be detected and compared to the expected angular distribution. A difference between the actual and expected values may be compared to an allowable tolerance to determine whether action is to be taken, such as manual or automated adjustments to process parameters or whether control system 20 should direct a marking component to mark an error indication on the web material. For example, the error indication may be a physical mark made or printed on the measured area or may be a fiducial mark printed along an edge of the web to record information related to the alignment error, such as the position and amount of alignment error between the micro-replicated features. In some cases, control system 20 includes a database or other non-transitory computer readable medium to record the measured alignment.

In another embodiment, measurement system 52 or control system 20 may analyze angular distribution of light beams 56A, 56B by processing position information from thresholded blobs in images associated with angular distributions 70A, 70B of FIG. 5. In a further embodiment, instead of measuring a crossing point of projection data from two light sources, projected data from a single light source may be analyzed, e.g., to fit a curve to the profile of the projection data, or to compare the measured angular intensity distributions of the image to an expected pattern.

Figure 6B:
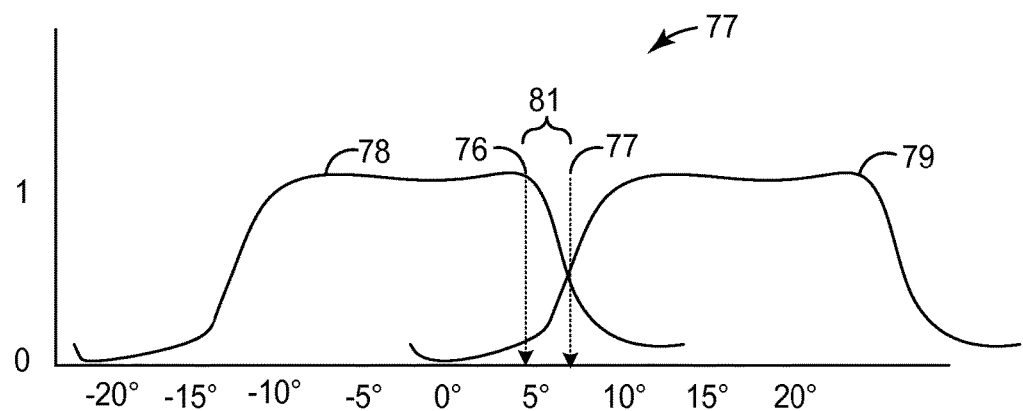

FIG. 6B is a graph that illustrates an example in which, based on normal web steering and the position of sensing system 25, control system 20 determines that the position of measurement area 57 is expected to produce angular distributions having a crossing point 76 at 5° for properly aligned product. However, as shown in FIG. 6B, measurement system 52 detects an actual crossing point 77 of 7°. Based on the angular deviation 81 of the detected crossing point 77 from expected crossing point 76, control system 20 calculates a position adjustment and performs fine-grain positioning adjustment, e.g., using preconfigured pitch information about the product to adjust the position of the features on one side of the product relative to those on the opposing side. This position adjustment may be, for example, on the order of microns or even sub micron. Alternatively, control system 20 outputs the recommended positioning adjustment to the operator for manual adjustment.

In this way, even though coarse-grain positioning system 59 is typically unable to provide alignment on the order of microns or sub-micron distances, the control system uses the initial cross-web position information to determine an expected angular distribution for the micro features of the web. By recording the relative location of measurement point 57 relative to the fiducial marks 61 at the startup of the process, measurement system 52 can determine the expected angular distribution for the instantaneous position of web material 12. This allows the system to determine an alignment error associated with the measurement area based on analysis of the angular distribution of the light by comparing the actual detected angular distribution compared to the expected angular distribution. The comparison of the actual and expected angular distributions may be used to determine an alignment error and perform additional, fine-grain adjustments based on the alignment error on the order of microns, and in some precision applications, sub-micron.

For example, based on an alignment error determined from the detected difference between expected angular distribution of light and actual angular distribution of light, the relative positioning of web material 12 and second tool 14B prior to application of the second micro-replication feature by tool 14B can be precisely adjusted. In general, based on the alignment error, adjustments may be made in real time to control any or all of lateral registration of the micro-replicated structures, downweb registration of the micro-replicated structures, and to adjust the relative pitch of the micro-replicated structures.

Figure 7:
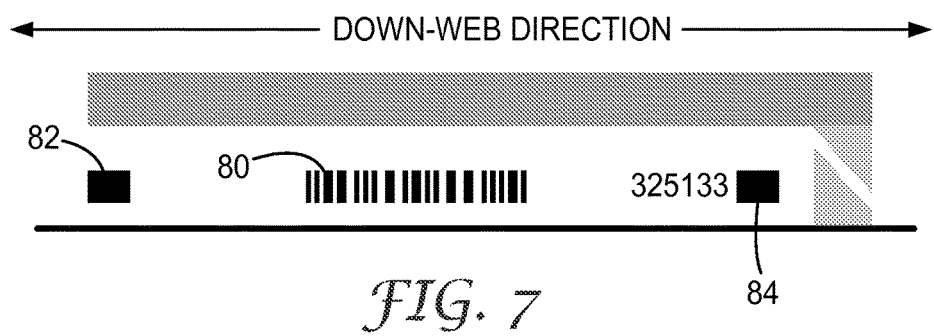
FIG. 7 is a diagram illustrating one embodiment of an example fiducial mark that may be printed or otherwise formed on the web material.

FIG. 7 is a diagram illustrating one embodiment of an example fiducial mark that may be printed or otherwise formed on web material 12. In one example, fiducial marks are placed at regular intervals throughout the length of web material 12, preferably outside of the salable area of the web, in order to accurately locate and uniquely identify a physical location on the web. In an embodiment of a fiducial mark as depicted in FIG. 7, a fiducial mark has one or more locating marks 82, 84 and a barcode 80. Locating marks 82, 84 enable fiducial mark reader 63 and coarse-positioning system 59 to accurately locate the position of barcode 80 in both the cross-web and down-web directions.

Barcode 80 represents information provided in a machine-readable format. Barcode 80 may, for example, encode a unique identifier for each fiducial mark. Barcode 80 may encode other information, such as position information based on a coordinate system used when applying the mark, an identifier for the web to which the mark has been applied, designation of production lines used or scheduled to be used for manufacturing the web, routing information defining a route for the web through manufacturing process lines and/or manufacturing plants, information identifying the material applied and in which order and area of the web, environmental conditions measured during the process, instructions for downstream processing of the web, and a host of other information. In one embodiment, barcode 80 may conform to the interleaved "2 of 5" symbology standard. In one embodiment, barcode 80 may represent a simple integer in the range from 0 to 999,999. In one embodiment, each fiducial mark placed on a web is one greater than the previous fiducial mark.

In one embodiment, fiducial marks may be applied to a web using an inkjet printer. The process of placing fiducial marks on a web is described in further detail in Floeder et al., U.S. Pat. No. 7,542,821, Multi-unit process spatial synchronization of image inspection systems, which is hereby incorporated by reference in its entirety. Other embodiments may represent fiducial marks in a variety of other ways. For example, data may be represented by a 1D barcode, a 2D barcode, optical character recognition (OCR), or magnetically encoded. Furthermore, other embodiments may apply fiducial marks to a web using inkjet printing, laser printing, or by securing mechanical labels to the web. Other means of representing a fiducial mark, as well as other application methods, may also be used.

Referring again to FIG. 4A, coarse-grain positioning system 59 may utilize fiducial marks to compute and output coarse-grain electronic position data 65 to provide position data having an accuracy on the order of millimeters, or in some embodiments on the order of tens of microns, within the coordinate system of manufacturing system 10. Measurement system 52 utilizes this initial position data 65 to compute an expected angular distribution for the micro features of web material 12 currently illuminated by light sources 60A, 60B. Based on the expected angular distribution, measurement system 52 produces position signals 22 indicative of the alignment between the prism tips and the axes of the micro lenses in the 1-2 mm diameter measurement area 57 defined by the collection optics and the input beams. Position signals 22 may, for example, take the form of an error signal for purposes of closed-loop control, where the error signal conveys any alignment error in units of ±microns, such as within five microns, within one micron or even with a sub-micron accuracy. In applications where the alignment of micro features does not deviate as a function of cross-web position, use of coarse-grain positioning system 59 may not be necessary.

The alignment accuracy of measurement system 52 is a function of the size pitch of the micro features, the radius of the micro lenses, and the angular resolution of array sensor 50 used to record the angular spectrum. Measurement system 52 achieves a high-level of accuracy by exploiting the repetitive nature of the micro structures formed on web material 12 because the light distribution is averaged over all of the structures that are illuminated and lie within the measurement volume collected by the lens 54. In this way, the angular distribution analyzed by measurement system 52 is less sensitive to small abnormalities in any given micro lens 44 or local defect that may exist on the focal-plane side of web material 12 for any one micro feature. Experiments have shown the ability to measure the alignment of structures within 0.1 μm for lenticular microlens arrays with nominally 50-70 μm pitch and radii of curvature of 30-55 μm, using an array camera with 1024×1360 pixels and a Fourier lens setup that provides nominally 0.03°/pixel (i.e., about ±20 degrees angular range in the 1360 pixel direction).

Figure 8:
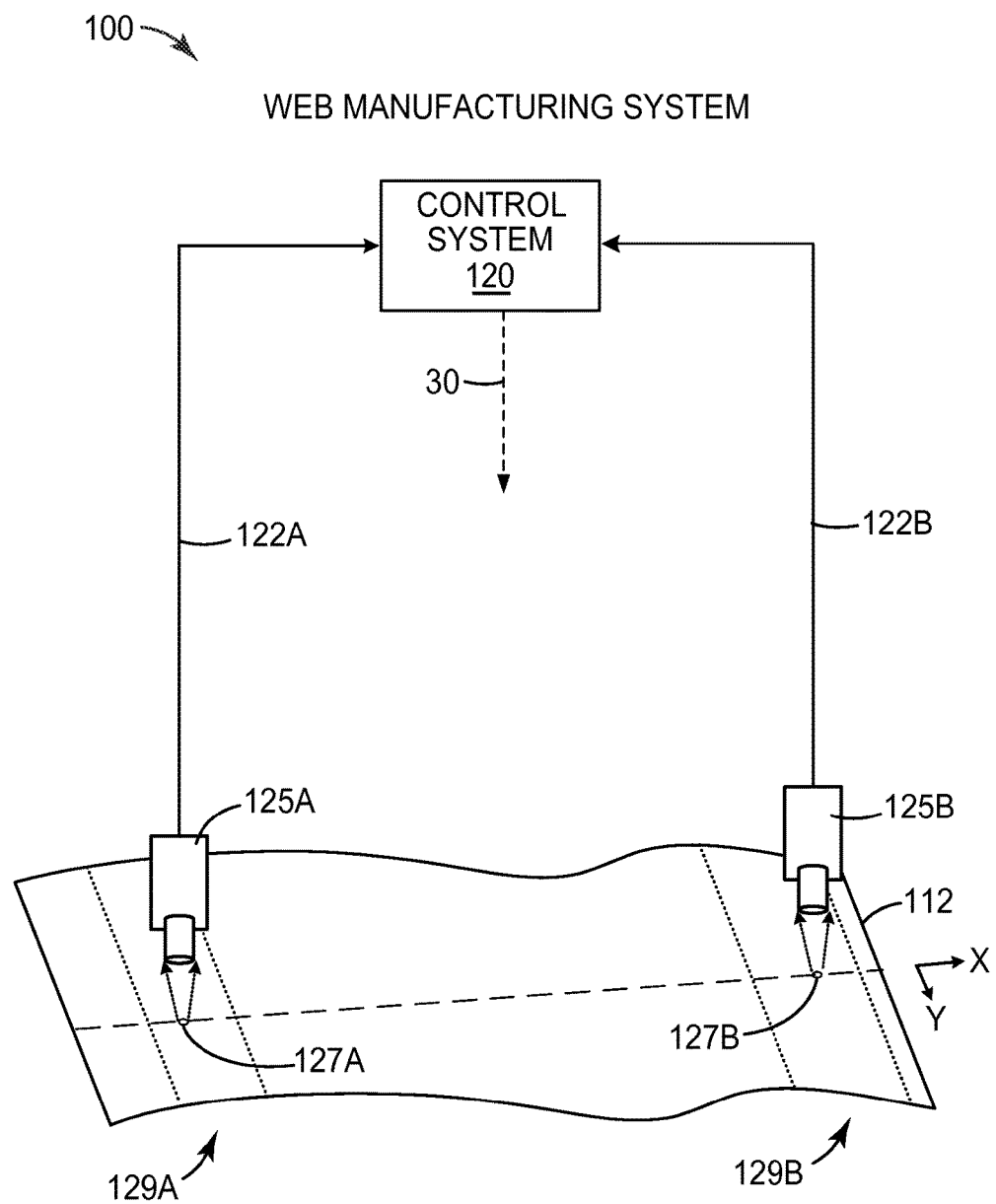
FIG. 8 illustrates another embodiment of a web manufacturing system in which a control system utilizes position signals for both cross-web and down-web registration control, i.e., position control.

FIG. 8 illustrates another embodiment of a web manufacturing system 100 in which control system 120 utilizes position signals 122A and 122B for both tension/strain control as well as web position control. Web-based manufacturing system 100 may be substantially similar to web manufacturing system 10 of FIG. 1 in that multiple micro-replication tools or stations (not shown) may be used to produce web material 112 to have microstructures that run continuously in the down-web direction. For purposes of example, web 112 is shown in FIG. 8 as moving in a direction Y and having a cross-web direction X.

In this example, manufacturing system 100 includes two sensing systems 125A, 125B that provide accurate, real-time measurements of the relative positions of the sub-micron features formed by the tools, or the relative positions of the sub-micron features and a tool for forming additional sub-micron features. Each sensing system 125A, 125B may be substantially similar to sensing system 25 described above. In this case sensing systems 125 provide signals 122 that indicate or are derived from the angular distribution of light received from corresponding measurement areas 127A, 127B. As discussed above, sensing stations 125 may be positioned downstream from the tools or at one of the tools, but may be used for position and tension control of web material 112 as the web material is fed into the second tool for the second layer of micro features, e.g., microprisms 40. Position and tension control at an upstream location may be achieved, for example, as the relative registration of the multiple layers of micro features is fixed once formed by the second tool and, therefore, are unaffected by tension or position variations that may occur after the second tool but prior to sensing systems 125.

In one example, web material 112 may be manufactured to carry multiple lanes of product, such as product lane 129A and product lane 129B. Web material 112 may be manufactured such that each of the product lanes 129 is formed in a manner consistent with the structures depicted in FIG. 2. For example, each of product lanes 129 may have micro lenses on a top surface and micro-prisms on a bottom surface of web material 112. Moreover, as shown in FIG. 2, each of product lanes 129 may be formed such that the microfeatures at a center portion of each product are expected to be precisely aligned, as shown by microlens 44A microprism 40A of FIG. 2. In another example, web material 112 may be manufactured for a single lane of a product, having two sensing systems 125A, 125B at different positions of the product.

Position signals 122A, 122B are fed from sensing system 25 to control system 120, which provides real-time control over tension within web 112, such as at a point upstream in the manufacturing process where the web material is transported through the micro-replication tools. In the example of FIG. 8, sensing systems 125A, 125B are positioned relative to the fiducial markings so that measurement areas 127A, 127B correspond to positions on the product lanes 129A, 129B where the angular distribution of light for both pairs of light sources (e.g., light sources 60A, 60B of FIG. 3) are expected to cross at zero degrees. However, in some aspects, even when using fiducial markings to account for the presence of web steering, i.e., a shift in the cross-web position of web material 112, a shift from an expected crossing point for the angular distribution of light received from each light source of sensing system 125A and/or sensing system 125B may be detected, e.g., due to incorrect tension, due to incorrect registration between a micro replication feature and features of a tool for creating a second micro replication feature. As discussed above, this absolute change in the angular distribution at each measurement area 127A, 127B can be detected. Based on the difference between expected angular distributions of light and the measured angular distributions of light, the relative positioning of web material 112 and tool 14 prior to application of the second micro-replication feature by tool 14B can be precisely adjusted. There are two sensors, so two independent parameters can be adjusted: downweb tension controls the cross-web strain, and hence the difference between the measured angular distributions, and the relative positions (i.e. alignment) of the opposing microstructures controls the average (or sum) of the two measurements. Other independent combinations of the sensing data from the two sensors can also be used, e.g. the angular output from a single sensor and the difference between the two.

In any case, regardless of the arrangement of sensing systems relative to the product lane or lanes, as long as the expected angular distribution of light is known for the measurement areas of the sensing systems, one will be able to detect whether lateral or longitudinal position movements of the web relative to tools 14A or 14B occur based on the actual angular distributions detected, provided the positions of sensors 125A and 125B are known.

Furthermore, improper tension in web material 112 prior to application of the second micro feature can also result in misalignment the micro features, which in turn leads to a change in detected crossing points for the light from the two light sources at each of sensing systems 125. However, a tension variation manifests in a different change in the relative alignment of the micro-features at each measurement area 127, and this relative change can be used to distinguish tension-induced alignment errors from alignment errors caused by mis-registration of micro-features.

For example, tension variations affecting stress in the down-web direction Y cause changes in the cross-web dimension X of web material 12. A typical magnitude for the cross-web strain coefficient for a 3 mil PET film with a cured prism microstructure on one side is $1 \times 10^{-5}$ mm/mm/lbf. Consequently, a tension variation of 0.1 lbf acting across 250 mm of such a web would cause a cross-web dimension change (i.e., web stretch for an increase tension variation) of 0.25 μm. Such a cross-web distortion of the prism-coated web material 112 prior to processing by the second coating station would cause the relative alignment between micro-prisms 40 and micro lenses 44 (FIG. 2) at measurement areas 127A, 127B to deviate from the expected alignment. For example, a 0.25 μm deformation in the cross-web dimension would skew the crossing point for the angular distributions recorded by sensing system 125A as the applied micro lenses 44 would align with micro-prisms 40 at a position off-center of product lane 125A. Similarly, the 0.25 μm deformation in the cross-web dimension due to tension variation would skew the crossing point for the angular distributions recorded by sensing system 125B to a position off-center of product lane 125B. Taking the difference between the angular distributions recorded by sensing systems 125A and 125B informs on how to adjust tension, independent of where the stretch is centered.

Control system 120 computes the difference between the angular distributions from sensing systems 125, and configured with the distance between the sensors and the expected angular performance of web material 120 at measurement areas 127A, 127B, outputs actuator control signals 130 to modify one or more transport elements of web manufacturing system 100 until the difference between the measured angles matches the expected angular difference associated with the feature design. As another example, control system 120 may display a computed process control parameter, such as a current web tension value, to an operator in order to allow the operator to modify an operating parameter of the web-based manufacturing system 100. As a further example, control system 120 may display to the operator the detected angular distributions or may display the difference between the angular distributions.

In one example, control system 120 time-averages the data to take out cyclical fluctuations caused by any rollrunout, which allows control system 120 to set the tension to an increased resolution, e.g., 0.1 lbf. For a lens pitch of 50 μm, sub-nm variations in pitch may be controlled. For example, a 1 μm cross-web dimension change on the lens features across 250.001 mm of product is resolvable by tension control. This would otherwise introduce an increased prism pitch of 50.0002 μm. Consequently, in this example the techniques achieve an accuracy of 2 Angstroms for the pitch, assuming constant pitch across the full product width. Adaptive and feedforward techniques may also be used to remove the cyclical repeatable error components inherent in any web transport process.

The accuracy figures cited above correspond to features that are at the focal plane of the lenses of sensing systems 125 that record the angular distribution of light rays, such as lens 54 described above with respect to FIG. 4A. This accuracy may be degraded if the micro features do not lie at the focal plane of the lenses, such as may be caused by large variations in thickness as web material 112 is manufactured. However, such variations can be corrected if the current thickness of web material 112 is measured and the angular distribution of light leaving the opposing features, e.g., the prism tips, is known or can be computed. In many cases, however, such corrections for total thickness variations on the order of a few microns need not be made as such variations may be negligible in view of an example total thickness on the order of 170 μm.

In the examples above, the techniques were described with respect to a web product that involves lenticular (i.e. one-dimensional focusing) lenses on one side of the web and a prism microstructure on the other. The relative position on the alignment structures can be used as feedback to control the manufacturing process, or as a quality metric for quality control testing of samples. Although, for exemplary purposes, an embodiment has been described using two sensing systems to provide alignment feedback and tension control, the techniques can be generalized to characterize the alignment of any lenslet array or other optical elements (with one- or two-dimensional focusing power) relative to any array of light-active structures located at the focal plane of the optical elements. In some embodiments, scanning or repositionable sensor locations may be used in web applications involving single or multiple patterns.

Figure 9A:
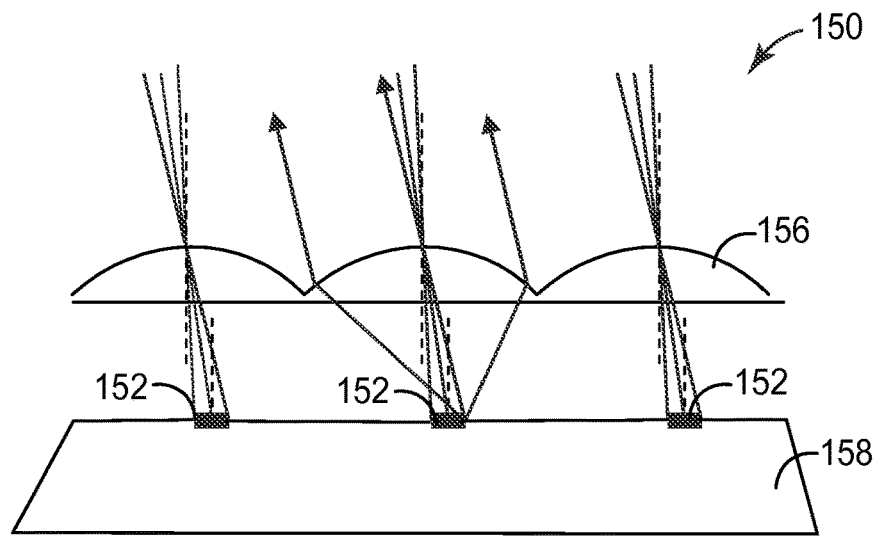
FIG. 9A illustrates another embodiment in which the techniques are applied to imaging applications.

FIG. 9A illustrates another embodiment in which the techniques described herein are applied to virtual or integral imaging applications. Web material 150 may be manufactured to include printed/transferred features 152 located at the focal plane of a lenticular array of micro lenses 156. In such applications, printed/transferred features 152 are typically aligned with the pitch of lenses 156 so as to create certain visual effects and displays. The techniques described herein can be applied to control registration of printed/transferred features 152 with the pattern of micro lenses 156. This technique can be extended to two-dimensional microlens arrays, such as spherical or aspheric microlens arrays. In an application where a pattern of printed or transferred features 152 is positioned on a side opposing the microlens array, the control techniques described herein can be used to determine registration between the each printed features and the corresponding lenslet or lenslets. This may be useful, for example, to more accurately produce product that creates a composite image that appears to have certain characteristics.

With the techniques described herein, a high-resolution printing process could be used to print the features on the backside of the lens film, and an angular distribution of light transmitted (or absorbed) through (by) printed features 152 could then be used to determine the registration of the features with respect to the micro lenses of the web material. For example, similar to the description above, any cross-web deviation in alignment between the printed features and the micro-lenses causes angular distribution of the light exiting the lenses. As described herein, any positional error in the registration of printed features 152 and micro-lenses 156 may be used to control the position and/or tension of web material as it is transported through the printing stage. Alternatively, the position information determined by this technique may instead, or additionally, be used to finely control the imaging apparatus (e.g., laser) when maintain registration with lenses 156. Further details of example techniques for forming microlens sheetings having printed material in registration with patterns of micro-replicated lenses are described in U.S. Pat. No. 7,336,422, entitled "Sheeting with composite image that floats," and U.S. Pat. No. 7,586,685, entitled "Microlens sheeting with floating image using a shape memory material," the entire content of each being incorporated herein by reference.

Figure 9B:
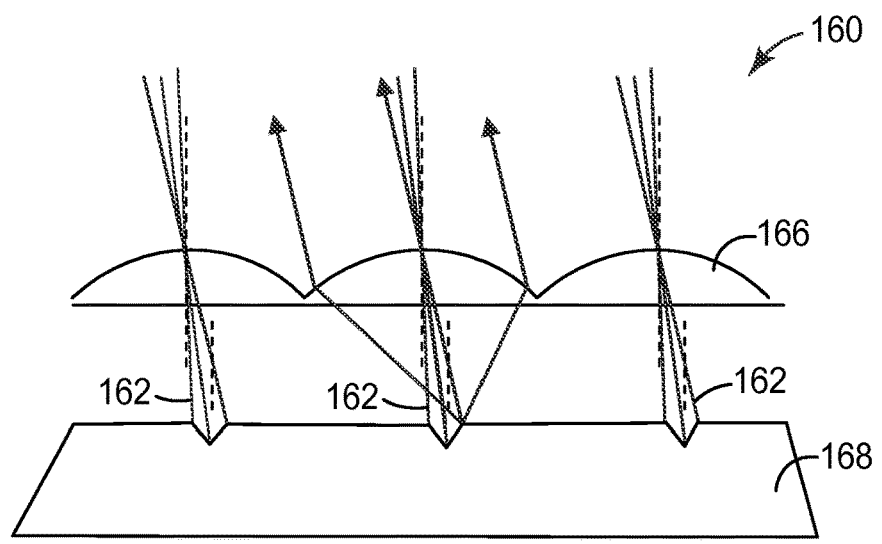
FIG. 9B illustrates another embodiment for determining relative registration between micro-replicated features on the web material and a micro-replication tool in contact with the web material.

FIG. 9B illustrates another embodiment in which the techniques described herein are applied to determine relative registration between micro-replicated features on the web material and a tool or precision idler in contact with the web material at the focal plane of the lenses. Web material 160 may include a lenticular array of micro lenses 166 that are aligned at a particular moment of time with a tool for creating microprisms on an opposing side of web material 160, such that features 162 of tool 168 (e.g., valleys for replicating microprisms) are positioned nominally at a focal plane of the lenses. At this alignment, the angular distribution of the light rays reflected through the microlenses can be detected and compared to an expected angular distribution. This example is based on reflective rather transmissive geometry as described above. In this manner, an alignment error may be determined and used to immediately change the relative positions of the web material 160 and the tool 168 so as to adjust the alignment between the microlenses and the features of tool 168. Although this example describes the one-dimensional version assuming the web structures are a lenticular array 166 and the tool structures are microprisms, this can readily be generalized to the case of two-dimensional microlens arrays and other optically active structures on the tool 168, such that both cross-web and down-web alignment can be discerned and acted upon if necessary.

Figure 10:
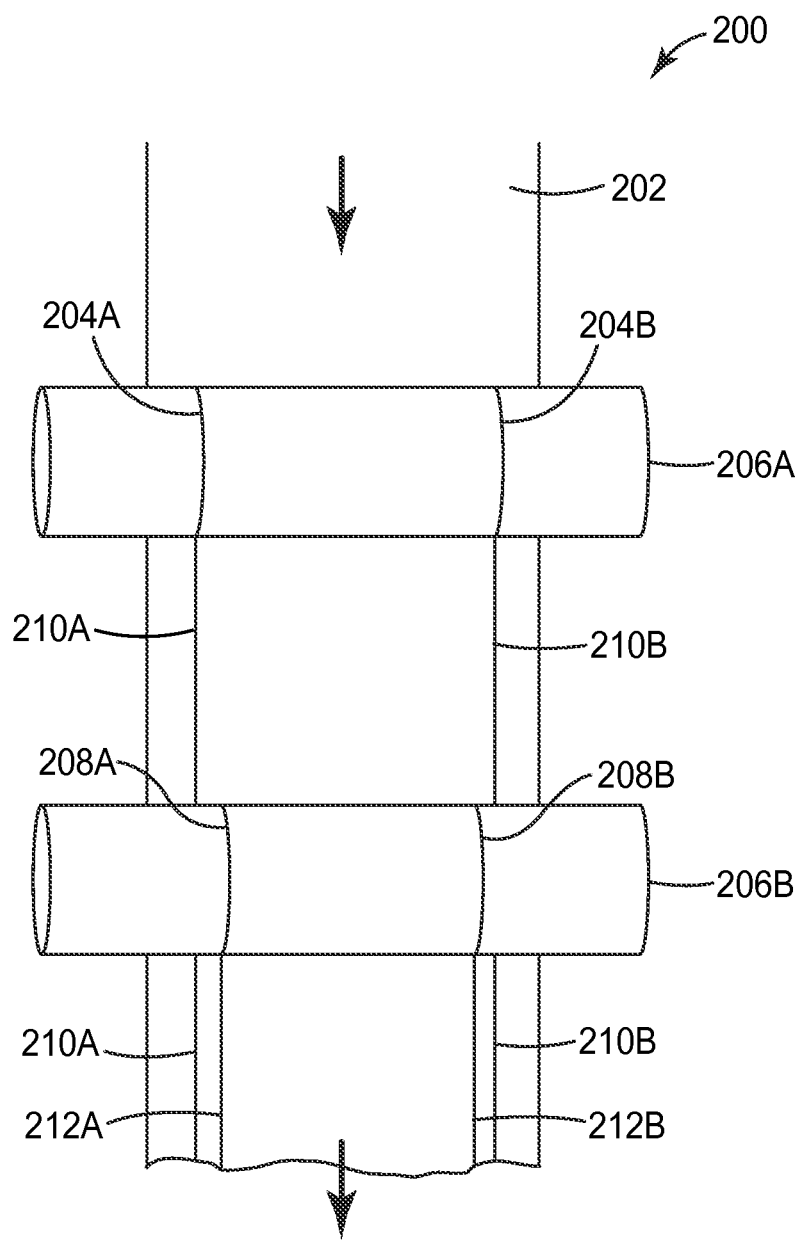
FIG. 10 block diagram illustrating a top view of a portion of a web-based manufacturing system in which a web material passes between tools.

FIG. 10 is a block diagram illustrating a top view of a portion of a web-based manufacturing system 200 in which a web material 202 passes between tools 206A and 206B. Tool 206A and 206B may be, for example, patterned rolls. A pattern or feature may be transferred from the tool to the web, such as by printing, laminating, embossing, extruding, curing, or other process. In the example of FIG. 10, a pattern or feature of lines 210A, 210B ("lines 210") is formed on web 202 by corresponding features 204A, 204B of tool 206A. Similarly, a pattern or feature of lines 212A-212B ("lines 212") is formed on web 202 by corresponding features 208A, 208B of tool 206B. In one example, lines 210, 212 are each about 70-100 microns wide. Lines 210, 212 can act as fiducial markings for use as coarse-grain control as described above.

In one example, web material 202 exits tool 206A with two lines 210 a known difference apart. The application of lines 212 is repeated on tool 206B, except that lines 212 are about 500 microns closer together than on tool 206A. After web material 202 exits tool 206B, one or more sensors measures a distance between each set of lines. The distances between the lines can be analyzed and compared to expected distances. In some cases, sinusoidal markings may be used.

Figure 11A:
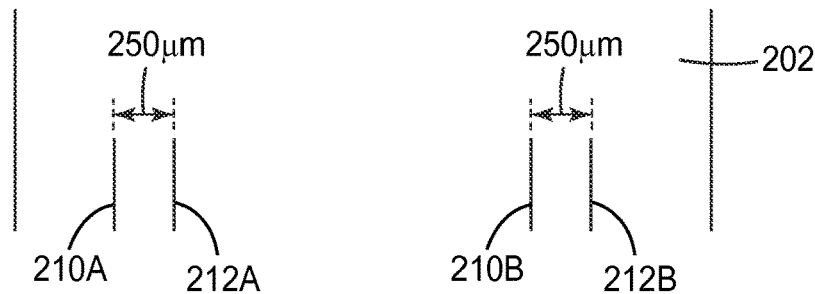
FIGS. 11A-11C are block diagrams illustrating measurement results upon application of lines to web material by system.
Figure 11B:
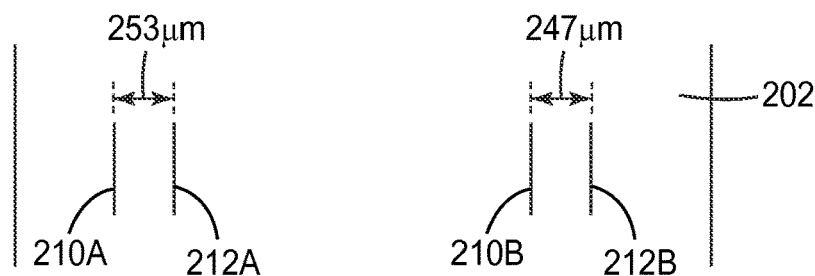
Figure 11C:
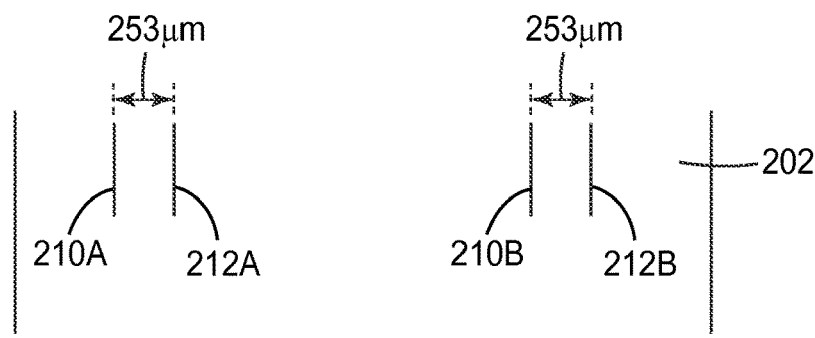

FIGS. 11A-11C are block diagrams illustrating three measurement results upon application of lines 210, 212 to web material 202 by system 200. FIG. 11A illustrates an example where lines 210, 212 are in perfect lateral registration, as well as perfect pitch. Each pair of lines 210, 212 is expected to be 250 microns apart. As shown in FIG. 11A, lines 210A and 212A are 250 microns apart, as are lines 210B and 212B.

FIG. 11B illustrates an example where lines 210, 212 have perfect pitch match, but lateral misalignment. As shown in FIG. 11A, lines 210A and 212A are 253 microns apart, and lines 210B and 212B are 247 microns apart. This is interpreted by the control system to indicate that the web material 202 on the second tool 206B has been shifted three microns to the right. The control system uses this information to correct for the shift by adjusting process control parameters.

FIG. 11C illustrates an example where lines 210, 212 have perfect registration but imperfect pitch match. The distances between lines 210A, 212A and between lines 210B, 212B are the same distance of 253 microns, so the web material 202 on the second tool 206B is centered with respect to the first pattern laid down by tool 206A. However, the web material 202 has too high of tension and strain, which causes web material 202 to "neck in," making the distance between lines 210A, 212A and between lines 210B, 212B decrease compared to the expected distance of 250 microns; now the gaps between the lines from the first and second tool are too large, indicating improper pitch match. The control system uses this information to change tension or strain to bring both line distances back to the expected 250 microns. For example, the tension change may be achieved by adjusting the velocity of the second tool 206B with respect to the first tool 206A. A cross-web position of the web material, a down-web position of the web material, and a tension/strain applied to the web material may simultaneously be adjusted based on the determination of distances between fiducial lines.

This technique may dramatically improve the resolution of web strain. For example, the technique may allow sensors to resolve to tenths of a micron (e.g., 0.1 microns), and have a 7 mm field of view. The sensors therefore can resolve 0.1/7000=14 ppm strain. However, using two sensors spaced about 350 mm apart can resolve 0.1/350=0.3 ppm, dramatically increasing strain resolution as well as providing lateral and down-web alignment feedback.

Lines 210, 212 may be formed on the same side of web material 202, or may be formed on opposite sides of web material 202. The edges of web material 202 may also be used to guide the web, both alone and in combination with the fiducial lines technique, as well to as provide the coarse signal that can be used as a basis for certain fine signal techniques described above.

In some applications, a color camera and a white light source may be employed to simultaneously analyze the positions of multi-colored features. Using two-dimensionally active lenses allows feedback on alignment of features in both the down-web and cross-web directions. It can also provide high resolution of the directional alignment between two patterns, for example in laminated lenticular products.

There is also the potential to align reflective features with lenslet arrays, such as those used in flexible solar array applications, CCD and CMOS lenslet array applications, and light extraction films for LED arrays. The angle of the reflected light that returns from the reflective element and then transmits through the lens is only a function of the position of the reflective element, as long as the reflective feature is in the focal plane of the lenses. This could be useful for example for aligning photoreceptor elements in a flexible solar array with the lenslets above to optimize them for a particular range of sun angles.

While described for purposes of example in terms of micro replicated lenses, other micro replicated optical features may be used for determining an angular distribution of light. For example, the prisms that form the facets on a Fresnel lens may be used.

In some examples, features used to determine registration between features on opposing sides of the web material need not be continuous in the downweb direction, but may be applied and sampled periodically rather than continuously.

The reflective arrangement could also be used for precision web-steering and tension control applications. If a fiducial set of micro lenses (one- or two-dimensionally active) were placed on either side of the web, then these features could be steered relative to reflective features on a tool or precision idler in contact with the web material at the focal plane of the lenses, such as in FIG. 9B above. The radii of the lenses could be predetermined for a product with a given web thickness. Alternatively, the tool can have features that act essentially like concave mirrors, and the fiducial marks can be any of the pattern features described above. Using two sensors across the web width enables precision cross-web dimension control, as described above. This can provide feedback not only on cross-web dimensional variations and tension control, but also on precision web stretching applications. A similar principle can be used to monitor shrinkage of coated films or molded features as cure occurs. And if two-dimensional features are used, then down-web registration can also be measured.

In another embodiment, the relative alignment is measured between the lenslet array and an array of light emitters, such as could be found in LED arrays or fiber-optic arrays. In this case, the light emitters may be positioned at the focal plane of the lens array, and the relative position of the light sources with respect to the lenses would be determined by the angular output from the lenses. In general, a patterned beam could be directed out to the film plane, and the position of the film relative to the pattern of the beam(s) could then be measured.

Precision measurement of the cross-web and/or down-web dimensions of a film can be useful in a variety of applications. Examples include on-line dimensional verification of lithographic films, lens arrays for biosensors that will be mated with microwell arrays, parts for application in opto-electric circuits and/or data storage, displays and turning films of multiple configurations. Fiducial lens array structures could be incorporated into the film design, either as part of the functional product construction itself, outside the usable product area, or at known positions within product, and then the relative position of these features can be used to confirm alignment and/or dimensional accuracy in web processes.

In one embodiment, the relative alignment of microreplicated features on the web may be recorded within a database and used during conversion of the web into product. For example, the alignment at one or more cross-web positions may be detected and recorded, and a database of cross-web alignment information may be created for the entire web as the web is transported through the detection system described herein. This alignment information may be subsequently used to control the conversion of the web into product. That is, a converting system may utilize the cross-web alignment data to automatically position the converting equipment in a cross-web direction, either by move the converting equipment or the web, or both, in the cross-web direction, so that product is cut from areas of the web in which the alignment of the micro-replicated features of the web material are within tolerance limits. The converting system may in this way track the aligned areas in the cross-web direction as the web material in transported into through the converting system and is cut into individual products, thereby potentially increasing yield.

Various embodiments of the invention have been described. These and other embodiments are within the scope of the following claims.

The invention claimed is:

1. A method of manufacturing a patterned web material, the method comprising:
   conveying web material by a transport system through a first micro-replication station;
   forming a first pattern of micro-replicated lenses on the web material with the first micro-replication station;
   illuminating a set of the micro-replicated lenses by directing light from a first light source through the first pattern of micro-replicated lenses on the web material so as to exit from the micro-replicated lenses, the exiting light comprising a plurality of light angles;
   simultaneously directly detecting from the plurality of light angles a plurality of light intensities of an angular distribution of the light directed through and exiting from the micro-replicated lenses of the web material, the simultaneous direct detection taking place by passing the light directed through and exiting from the micro-replicated lenses through a multi-element lens, using optical properties of the multi-element lens to produce a Fourier transform of the angular distribution of the light entering the multi-element lens, and recording the Fourier transform of the angular distribution of the light entering the multi-element lens using an array sensor positioned at a focal length of the multi-element lens;
   analyzing the plurality of directly detected light intensities of the angular distribution of the light directed through and exiting from the first pattern of micro-replicated lenses; and
   determining an alignment error of the web material based on the analysis of the plurality of directly detected light intensities.

2. The method of claim 1, further comprising adjusting at least one process control parameter of the transport system based on the determined alignment error.

3. The method of claim 2, wherein the adjusting of the at least one process control parameter comprises adjusting a cross-web position of the web material as the web material is conveyed to the first micro-replication station.

4. The method of claim 2, wherein the adjusting of the at least one process control parameter comprises adjusting a down-web position of the web material as the web material is conveyed to the first micro-replication station.

5. The method of claim 2, wherein the adjusting of the at least one process control parameter comprises adjusting both a cross-web position and a down-web position of the web material as the web material is conveyed to the first micro-replication station.

6. The method of claim 2, wherein the adjusting of the at least one process control parameter comprises adjusting a tension of the web material as the web material is conveyed to the first micro-replication station.

7. The method of claim 2, further comprising displaying the adjusted process control parameter to an operator as a recommended adjustment.

8. The method of claim 1, further comprising recording the alignment error in a database.

9. The method of claim 1, wherein the alignment error exceeds a threshold, further comprising marking the web material upon the alignment error exceeding the threshold.

10. The method of claim 1, further comprising:
    forming a second pattern of micro-replicated features on the web material with a second micro-replication station,
    wherein the first pattern of micro-replicated lenses is formed with the first micro-replication station to repeat on a first surface of the web material in a cross-web direction, and
    wherein the second pattern of micro-replicated features is formed with the second micro-replication station to repeat on an opposing surface of the web material opposite from the first pattern of micro-replicated lenses.

11. The method of claim 10, wherein illuminating the set of the micro-replicated lenses by directing the light from the first light source through the first pattern of the micro-replicated lenses on the web material further comprises:
    illuminating the set of the micro-replicated features within a measurement area on the opposing surface to direct the light from the first light source through the set of the micro-replicated features and through the set of the micro-replicated lenses on the first surface of the web material.

12. The method of claim 11, wherein the set of the micro-replicated features comprise micro-replicated prisms.

13. The method of claim 12, wherein the alignment error of the web material represents an error from an expected alignment between the set of micro-replicated lenses and the set of micro-replicated prisms within the measurement area.

14. The method of claim 10, wherein illuminating the set of the micro-replicated lenses by directing the light from the first light source through the first pattern of micro-replicated lenses on the web material further comprises:
    illuminating a set of the micro-replicated features within a first measurement area on the opposing surface with the first light source to direct the light through the set of the micro-replicated features and through the set of the micro-replicated lenses on the first surface of the web material.

15. The method of claim 10, wherein illuminating the set of the micro-replicated lenses by directing the light from the first light source through the first pattern of the micro-replicated lenses on the web material further comprises:
    illuminating a set of the micro-replicated features within a first measurement area on the opposing surface with the first light source and with a second light source to direct light from the first and second light sources through the set of the micro-replicated features within the first measurement area on the opposing surface and through the set of the micro-replicated lenses on the first surface of the web material,
    wherein the simultaneously directly detecting from a plurality of light angles a plurality of light intensities of an angular distribution of the light from the first light source directed through and exiting from the set of the micro-replicated lenses on the first surface of the web material further comprises simultaneously directly detecting from a plurality of light angles a plurality of light intensities of an angular distribution of the light from the second light source directed through and exiting from the set of the micro-replicated lenses on the first surface of the web material, and wherein the alignment error is determined as a first measurement area alignment error based on a comparison of the simultaneously directly detected plurality of light intensities of the angular distribution of the light from the first light source that is directed through and exits from the set of micro-replicated lenses with the simultaneously directly detected plurality of light intensities of the angular distribution of the light from the second light source that is directed through and exits from the set of micro-replicated lenses.

16. The method of claim 15, wherein the second pattern of micro-replicated features comprises a set of micro-replicated prisms within the first measurement area, and further wherein the alignment error associated with the first measurement area represents an error from an expected alignment between the set of micro-replicated lenses and the set of micro-replicated prisms within the first measurement area.

17. The method of claim 15, wherein the alignment error associated with the first measurement area provides a sub-micron alignment resolution.

18. The method of claim 15, wherein determining the alignment error further comprises:
constructing a first one-dimensional projection based on the simultaneously directly detected plurality of light intensities of the angular distribution of the light from the first light source that is directed through and exits from the set of micro-replicated lenses;
constructing a second one-dimensional projection based on the simultaneously directly detected plurality of light intensities of the angular distribution of the light from the second light source that is directed through and exits from the set of micro-replicated lenses; and
determining a crossing-point for the first one-dimensional projection and the second one-dimensional projections, wherein the crossing-point specifies an angular position where the first and second one-dimensional projections overlap relative to a cross-web direction of the web material.

19. The method of claim 15, further comprising:
illuminating a second set of the micro-replicated features within a second measurement area with a third light source and a fourth light source to direct light through the second set of micro-replicated features and a second set of the micro-replicated lenses on the first surface of the web material;
simultaneously directly detecting from a plurality of light angles a plurality of light intensities of an angular distribution of the light from the third light source directed through and exiting from the second set of micro-replicated lenses;
simultaneously directly detecting from a plurality of light angles a plurality of light intensities of an angular distribution of the light from the fourth light source directed through and exiting from the second set of micro-replicated lenses by passing the light from the fourth light source directed through and exiting from the second set of micro-replicated lenses through the multi-element lens and recording a Fourier transform of the angular distribution of the light from the fourth light source entering the lens using the array sensor positioned at the focal length of the multi-element lens; and
determining a second measurement area alignment error based on a comparison of the simultaneously directly detected plurality of light intensities of the angular distribution of the light from the third light source that is directed through and exits from the second set of micro-replicated lenses with the simultaneously directly detected plurality of light intensities of the angular distribution of the light from the fourth light source that is directed through and exits from the second set of micro-replicated lenses.

20. The method of claim 19, further comprising adjusting a process control parameter based on the alignment error associated with the first measurement area and the alignment error associated with the second measurement area.

21. The method of claim 19, further comprising:
calculating a relative difference between the alignment error associated with the first measurement area and the alignment error associated with the second measurement area; and
controlling a tension or a strain of the web material as the web material is conveyed to the micro-replication station based on the calculated relative difference.

22. The method of claim 1, wherein forming the first pattern of micro-replicated lenses on the web material comprises forming the first pattern of micro-replicated lenses on a first surface of the web material, the method further comprising:
determining the alignment error as an alignment error between the micro-replicated lenses and features of a micro-replication tool for forming a pattern of micro-replicated features on a second side of the web material opposing the first side of the web material based on the simultaneously directly detected plurality of light intensities of the angular distribution of the light directed through and exiting from the micro-replicated lenses; and
controlling a relative position of the web material with respect to the micro-replication tool based on the determined alignment error.

23. The method of claim 1, wherein the alignment error provides a sub-micron alignment resolution.

24. The method of claim 1, further comprising:
automatically positioning converting equipment relative to the web material in a cross-web direction based on the determined alignment error to position the converting equipment at areas of the web material in which alignment of the micro-replicated lenses of the web material is within a defined tolerance limit; and
with the converting equipment, converting the web into product using the areas of the web in which the alignment of the micro-replicated lenses of the web material are within the defined tolerance limit.

25. The method of claim 24, wherein automatically positioning the converting equipment comprises moving the converting equipment or the web in the cross-web direction to cut product from areas of the web in which the alignment of the micro-replicated features of the web material is within the tolerance limit.

26. A method of manufacturing a patterned web material, the method comprising:
conveying web material by a transport system through a replication station;
forming a pattern of replicated lenses on the web material with the replication station;
after forming the pattern of replicated lenses on the web material, directing light from a light source through the pattern of replicated lenses on the web material so as to exit from the replicated lenses, the exiting light comprising a plurality of light angles;

simultaneously directly detecting from the plurality of light angles a plurality of light intensities of an angular distribution of the light directed through and exiting from the replicated lenses using an array sensor, the simultaneous direct detection taking place by passing the light directed through and exiting from the pattern of replicated lenses through a multi-element lens, using optical properties of the multi-element lens to produce a Fourier transform of the angular distribution of the light entering the multi-element lens, and recording the Fourier transform of the angular distribution of the light entering the lens using an array sensor positioned at a focal length of the multi-element lens; and adjusting at least one process control parameter of the web transport system based on the simultaneously directly detected plurality of light intensities of the angular distribution of the light directed through and exiting from the replicated lenses of the web material.

27. A method of manufacturing a patterned web material, the method comprising:

conveying web material by a transport system through a micro-replication station;

forming micro-replicated optical features on a first surface of the web material with the micro-replication station;

after forming the micro-replicated optical features on the web material, directing light from a light source through the micro-replicated optical features on the web material so as to exit from the micro-replicated optical features, the exiting light comprising a plurality of light angles;

simultaneously directly detecting from the plurality of light angles a plurality of light intensities of an angular distribution of the light directed through and exiting from the micro-replicated optical features, the simultaneous direct detection taking place by passing the light directed through and exiting from the micro-replicated optical features through a multi-element lens, using optical properties of the multi-element lens to produce a Fourier transform of the angular distribution of the light entering the multi-element lens, and recording the Fourier transform of the angular distribution of the light entering the multi-element lens using an array sensor positioned at a focal length of the multi-element lens; and adjusting at least one process control parameter of the web transport system based on the simultaneously directly detected plurality of light intensities of the angular distribution of the light directed through and exiting from the micro-replicated optical features of the web material.

28. The method of claim 27, further comprising:

forming micro-replicated features with a second micro-replication tool on a second surface of the web material opposing the first surface of the web material and opposite from a pattern of the micro-replicated optical features, the second micro-replication tool forming part of a second micro-replication station; and determining whether the micro-replicated optical features on the first surface of the web material are in an expected registration with the micro-replicated features on the second surface of the web material based on the simultaneously directly detected plurality of light intensities of the angular distribution of the light directed through and exiting from the micro-replicated optical features on the first surface of the web material.

29. The method of claim 27, further comprising:

forming micro-replicated features on a second surface the web material on an opposing surface of the web material opposite from a pattern of the micro-replicated optical features on the first surface of the web material with a second micro-replication station; and determining whether the micro-replicated optical features on the first surface of the web material are in an expected registration with features of the second micro-replication station for forming the micro-replicated features on the second surface based on the simultaneously directly detected plurality of light intensities of the angular distribution of the light directed through and exiting from the micro-replicated optical features of the web material.

* * * * *